US010785628B2

(12) United States Patent
Geller

(10) Patent No.: US 10,785,628 B2
(45) Date of Patent: Sep. 22, 2020

(54) DISTRESS TRANSMISSION

(71) Applicant: Safe Sex Consent Inc, Mooresville, NC (US)

(72) Inventor: Wendy Geller, Mooresville, NC (US)

(73) Assignee: Safe Sex Consent, Inc., Mooresville, NC (US)

( * ) Notice: Subject to any disclaimer, the term of this patent is extended or adjusted under 35 U.S.C. 154(b) by 0 days.

(21) Appl. No.: 16/280,010

(22) Filed: Feb. 19, 2019

(65) Prior Publication Data

US 2020/0084607 A1    Mar. 12, 2020

Related U.S. Application Data

(63) Continuation-in-part of application No. 16/125,746, filed on Sep. 9, 2018, now abandoned.

(51) Int. Cl.
| | |
|---|---|
| *H04M 11/04* | (2006.01) |
| *H04W 4/90* | (2018.01) |
| *G06F 3/0482* | (2013.01) |
| *G06F 3/0488* | (2013.01) |
| *G06F 3/0481* | (2013.01) |
| *H04W 4/02* | (2018.01) |

(52) U.S. Cl.
CPC ............ *H04W 4/90* (2018.02); *G06F 3/0482* (2013.01); *G06F 3/04817* (2013.01); *G06F 3/04883* (2013.01); *G06F 3/04886* (2013.01); *H04W 4/02* (2013.01)

(58) Field of Classification Search
CPC ......... H04W 4/90; H04W 4/02; H04W 4/029; G06F 3/0482; G06F 3/04886; G06F 3/04817; G06F 3/04883; G08B 25/016
See application file for complete search history.

(56) References Cited

U.S. PATENT DOCUMENTS

| | | | |
|---|---|---|---|
| 2009/0205041 A1* | 8/2009 | Michalske | H04W 4/90 726/17 |
| 2012/0282886 A1* | 11/2012 | Amis | G06F 3/016 455/404.2 |
| 2013/0328683 A1* | 12/2013 | Sitbon | G08B 21/088 340/573.6 |
| 2015/0163626 A1* | 6/2015 | Zimmer | H04W 4/029 455/404.2 |
| 2017/0180964 A1* | 6/2017 | Mehta | H04W 4/90 |
| 2017/0318446 A1* | 11/2017 | Lee | H04W 4/90 |
| 2019/0051144 A1* | 2/2019 | David | G08B 21/02 |
| 2019/0114902 A1* | 4/2019 | Lazarski | G08B 5/36 |

\* cited by examiner

*Primary Examiner* — Barry W Taylor
(74) *Attorney, Agent, or Firm* — Da Vinci's Notebook, LLC

(57) ABSTRACT

The present invention includes a device for the transmission of a communication transmission with a communication menu facilitating communication between a user and an operator with bespoke information.

13 Claims, 12 Drawing Sheets

FIG. 3
FIG. 4
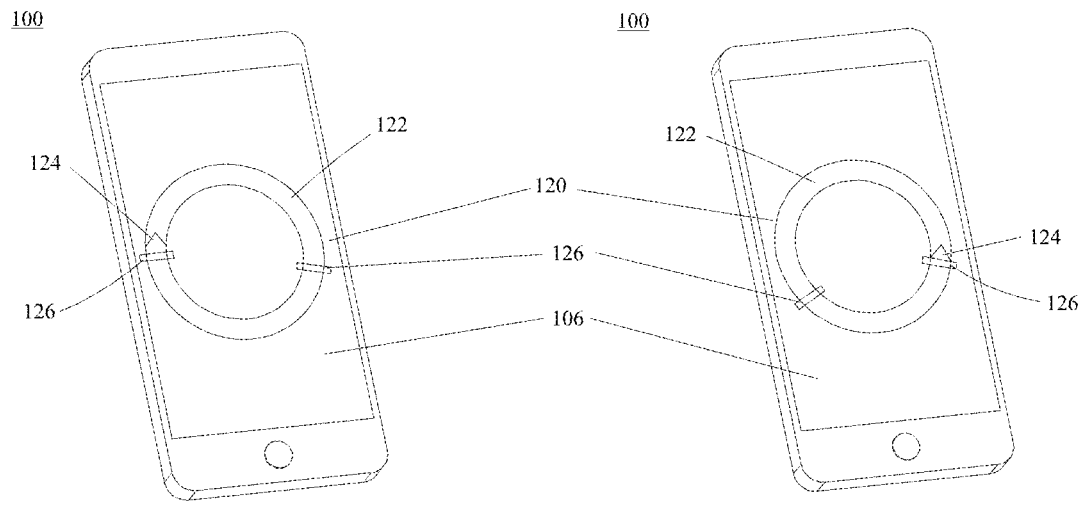
FIG. 5
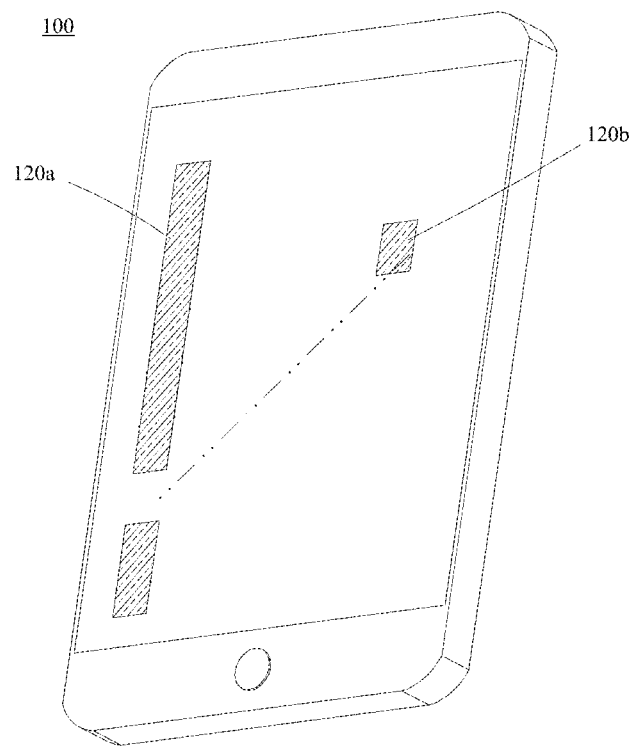

DISTRESS TRANSMISSION

RELATED APPLICATIONS

This application is a continuation-in-part, and claims priority under 35 U.S.C. § 120 from U.S. patent application Ser. No. 16/125,746 titled Distress Transmission filed on Sep. 9, 2018.

FIELD OF THE INVENTION

The present invention relates to the field of safety and more specifically to the field of crisis communication.

BACKGROUND

Recent advances in mobile computing and wireless technology have transformed smartphones, apps and websites into invaluable tools that help users with not only communicating with others, but also with managing all aspects of their personal lives and business activities. Mobile devices are increasingly being used for personal safety management as well, where mobile devices can be used to capture evidence, thwart potential perpetrators, and transmit an alert for help. In this invention it is a silent alert for help, triggered by tracing a shape to confirm intent of connecting with 911 and other emergency assistance providers. This can be converted into a call or sent as a silent request for emergency assistance at a particular location, with no sign of the alert to authorities remaining evident on the device once sent.

A primary benefit of the present invention is that it permits a discreet, fast, simple way to communicate the existence of a dangerous situation location to an emergency assistance provider with no sign of the alert to authorities remaining evident on the device once sent.

Often during an emergency, a person can not effectively communicate relevant information because of existing circumstances or disabilities: whether related to time, saying they do not know the address of their current location (because GPS got them there), when danger is close-by or in the next room, medical problems, speech or hearing difficulties, language proficiency barriers, conspicuousness or plain straight-out inability (think hostages, domestic violence, child abuse, fear-freezing) to explain the need for authorities or their advanced technological devices to come for an emergency at a specified location.

SUMMARY

The present invention includes a system for the transmission of a distress signal, along with a computer for the transmission of a distress signal, and process for transmitting the distress signal. The device includes a computer with a body and having an arithmetic logic unit ("ALU"), a nontransitory computer-readable storage medium, a display having a touch digitizer, and a transmitter for the transmission of data to an external entity. A distress routine is recited within said storage medium and includes pre-loaded user file information having access to an emergency contact database, and adapted to transmit a distress signal bearing an emergency distress category to an emergency assistance provider while divulging the user information. The display exhibits a two-dimensional graphic overlay having a graphic path length and path direction variable in two-dimensions, whereby an uninterrupted physical trace along an alarm path length of, and co-extensive with, said graphic overlay answers a solution that initiates the distress signal. The system includes the computer of the present invention along with position indicator.

The process of the present invention includes configuring a Distress Routine that includes the device's current GPS location and/or pre-loaded user profile information and/or continuing to connect the now confirmed intended Distress Signal. The process exhibits a two-dimensional graphic overlay on the display, having a graphic path length and path direction variable in two-dimensions. A distress signal is initiated with a continuous physical trace along an alarm path length of, and co-extensive with, the graphic overlay. A distress signal is transmitted bearing the device's current GPS location and/or pre-loaded user profile information and/or continuing to connect the now confirmed intended Distress Signal to a campus, municipal or federal emergency assistance provider.

A disabled friendly version of the present invention includes a computer with a body and having an arithmetic logic unit ("ALU"), a nontransitory computer-readable storage medium in signaled communication with said ALU, a display on said body having a touch digitizer; and a transmitter for the transmission of data to an external entity. The external entity may include any of the emergency services of the present invention, as well as any other third party. This version of the present invention emphasizes transmission assistance rather than any particular target of information, so that the target may be the police or the user's favorite pizza restaurant. The significant of the present invention is the presence of pre-loaded data.

There is a distress or communication routine, recited within the storage medium, having the device's current GPS location and access to an emergency contact database, and adapted to initiate an audio communication transmission that upon connection to a communication operator initializes a communication assistance menu. There is a pre-loaded factual database having a data input subroutine adapted to accept and store free form data from a user. The communication assistance menu includes: (a) a graphic list of a biographic audio transmission selectors corresponding to multiple biographical information avatars corresponding having biographical content; and (b) a graphic list of circumstantial audio transmission selectors corresponding to multiple circumstantial information avatars having circumstantial content generated from said free form data.

There is a transmission indicator that varies based on a on at least two circumstances: (i) the source status of audio transmission, and (ii) a time status of said audio transmission. Furthermore, a region scour may determine regions applicable to the transmission to modify communication contacts and alter the pre-loaded factual information prior to an emergency or the necessity of utilizing the menu.

These aspects of the invention are not meant to be exclusive. Furthermore, some features may apply to certain versions of the invention, but not others. Other features, aspects, and advantages of the present invention will be readily apparent to those of ordinary skill in the art when read in conjunction with the following description, and accompanying drawings.

BRIEF DESCRIPTION OF THE DRAWINGS

FIG. 3 is an orthographic view of the present invention.
FIG. 4 is an orthographic view of the present invention.
FIG. 5 is an orthographic view of the present invention.

DETAILED DESCRIPTION

Figure 1:
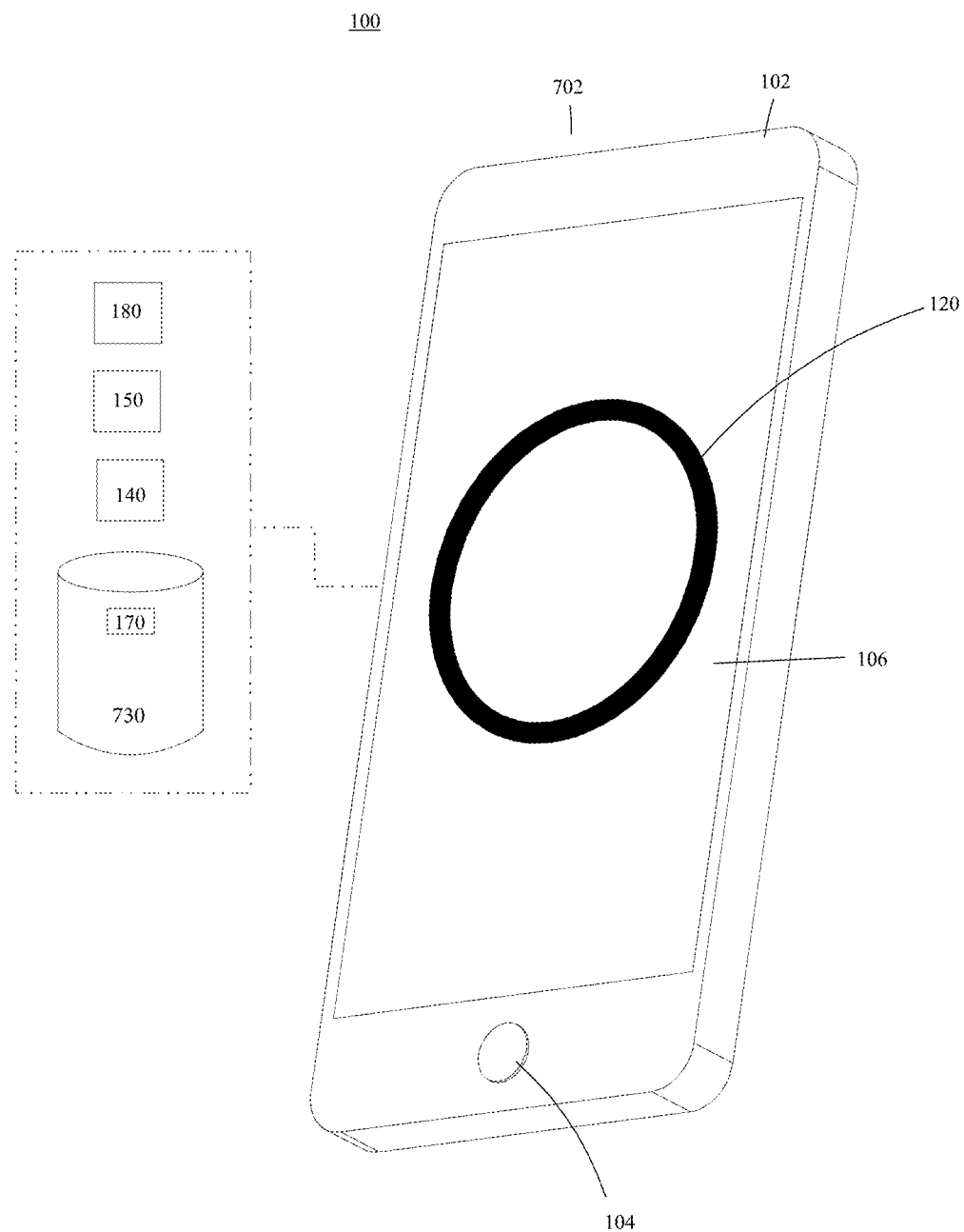
FIG. 1 is an orthographic view of the present invention.
Figure 9:
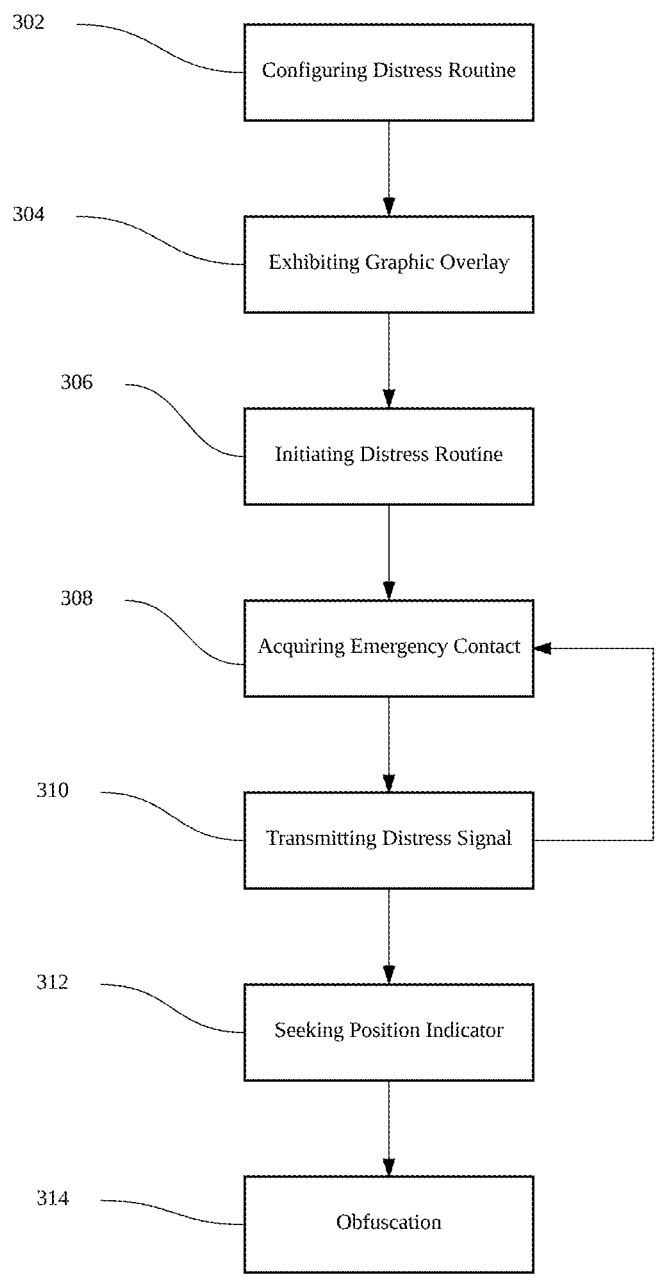
FIG. 9 is a view of the process of the present invention.

Referring first to FIGS. 1 and 9, a basic embodiment of the distress transmission device 100 and process 300 are shown. The distress signal device 100 includes a computer 702 with a body 102 and having an arithmetic logic unit 180 ("ALU"), a nontransitory computer-readable storage medium 730, a display 120, a touch digitizer 140; and a transmitter 150 for the transmission of data to an external entity (not shown). The computer may include one or many computers separated into one or more subcomponents, and the preferred computer includes a portable electronic device, e.g., smartphone or tablet or any touchscreen computer and automated teller machines (ATMs). A smartphone is the preferred example because such a device frequently includes an ALU, storage medium, display, touch digitizer, and transmitter in a single device. Furthermore, a smartphone, or other mobile computer, frequently includes a function input 104 that may subsume a variety of uses in accordance with the present invention.

Figure 7:
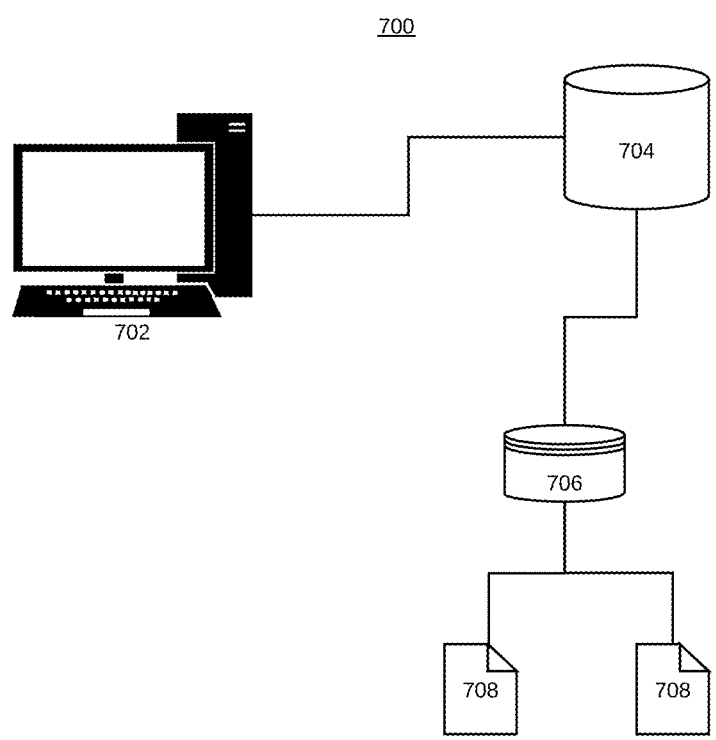
FIG. 7 is a view of a system of the present invention.
Figure 8:
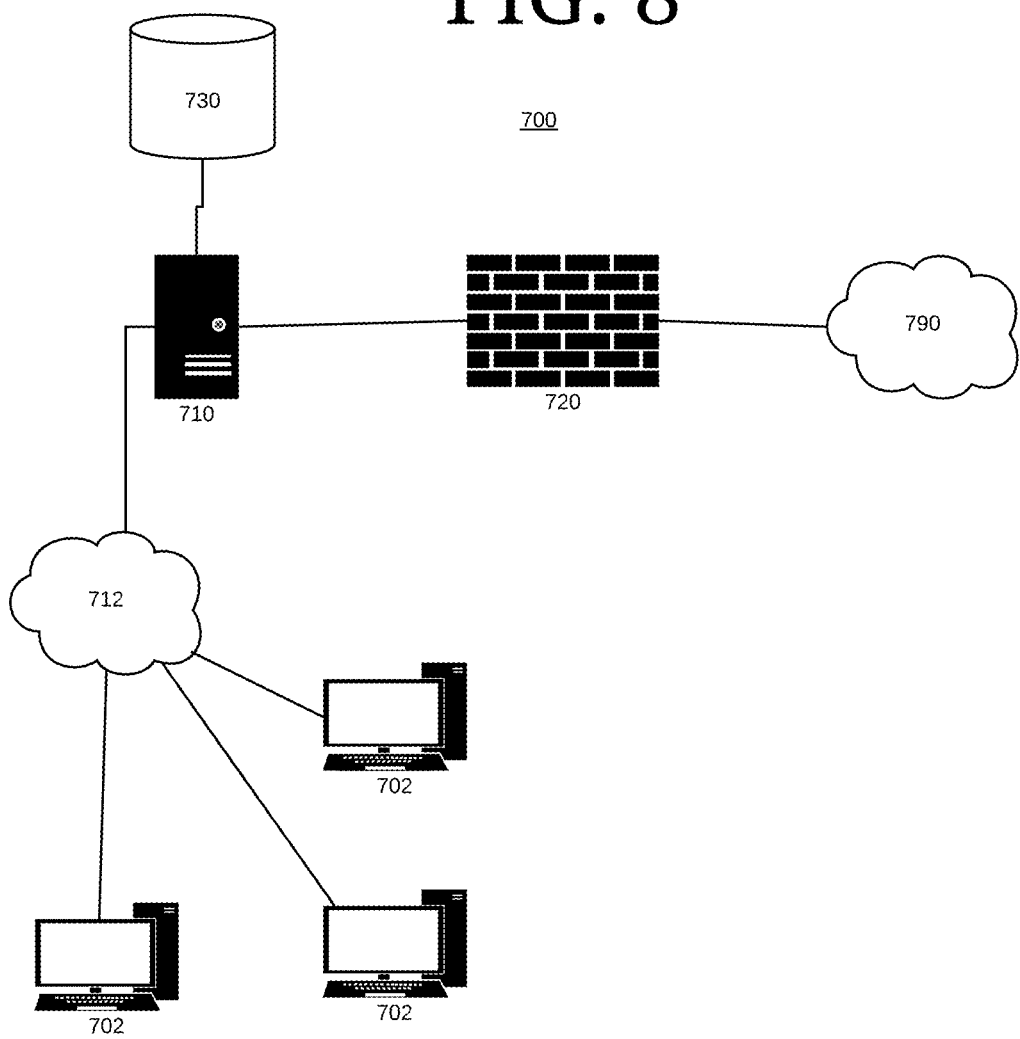
FIG. 8 is a view of a system of the present invention.

FIGS. 7-8 depict a computer ecosystem 700 of the present invention. By ecosystem it is meant one or more computers 702 that are organizationally related. The ecosystem may include computers under common ownership, computers that belong to the same network or series of networks, computers that are collaborating, etc. The present invention may be provided as a computer program product, or software that may include a computer-readable storage medium 704 having stored thereon instructions, which may be used to perform the process of the present invention across a computer ecosystem 700 according to the various embodiments disclosed herein.

A computer 702 of the present invention may include any combination of one or more computer readable media 704. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a cloud storage device or any suitable combination of the foregoing. In the context of this document, a computer readable storage medium 704 may be any tangible medium that can contain, or store a program for use by or in connection with an instruction execution system, apparatus, or device.

A computer readable signal medium 704 may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Furthermore, the functionality of one block may be subsumed by the functionality of another block as a sub-step thereof. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

An ecosystem 700 may further include a computer network or data network that allows computers to exchange data. In a computer network of the present invention, networked computing devices pass data to each other along data connections. The connections between nodes are established using cable media, wireless media, or other media. The Internet or other exterior network 790 may be a component of the ecosystem. Nodes may include hosts such as personal computers, phones, servers, and networking hardware. Two such devices are networked together when one device is able to exchange information with the other device, whether or not they have a direct connection to each other. Computer networks of the present invention support applications such as access to the World Wide Web, shared use of application and storage servers, printers, and fax machines, and use of email and instant messaging applications. Computer networks may be included irrespective of the physical media used to transmit their signals, the communications protocols to organize network traffic, the network's size, topology, and organizational intent.

It is preferred that the network of the present invention have at least one boundary 720, and potentially multiple boundaries if a demilitarized zone is utilized. The boundary 720 may include any number of layers designed to regulate and secure the flow of information between networks. Boundary layers of the present invention may include enterprise content management software, firewalls, filters, threat management software, alarms, etc. Software for establishing a boundary may be run on a server 710 with server storage 730 of the present invention, which may include directory services controlling access credentials.

To combat security risks posed by network connections, firewalls are frequently used. A firewall may be a hardware or software component that filters network traffic so that communications with unauthorized third parties are blocked but legitimate network functions may be carried out. Frequently, the filters applied by a firewall are specified by a set of policies defining characteristics of network messages that either should pass through the firewall or that should be blocked. Because different levels of communication may be appropriate depending on the origin or destination of messages, firewall policies may be provided for each application that executes on a computing device and communicates over a network.

A firewall may have an outward side facing a global network, such as the Internet. The opposite side of the firewall may be a private network that is protected by the firewall. The private network may include any number of host machines (e.g., computers) each addressable by its own IP address. The physical construction of the network may be such that all data packets intended for one of the IP addresses behind the firewall pass through the firewall. Using the firewall rules, which may be set by a network administrator or other user, the firewall may determine whether to allow or deny certain data packets and/or determine where to route particular data packets based on the IP addresses to which the packets are directed. The determination of where to route data packets may be done using the IP addresses of the host machines in the private network.

Depending on the addressing scheme used by the network, the IP addresses of the host machines may be static or dynamic. Static IP addresses do not change over time, and thus once they are set in the firewall rules, there is no need to update them. The Internet Protocol Version Four (IPv4) addressing system commonly uses static addressing, while IPv6 may use dynamic addressing. Dynamic IP addresses may change over time and thus, there is a need to update the firewall rules as changes occur. When a small Local Area Network (LAN), such as a domestic network in a private residence, is linked to a larger network such as the Internet, the link is often through a gateway router acting as a firewall. One of the functions of the firewall is to protect the LAN from intrusion from outside.

A service directory accessible by a server 710, usually on server storage 730, stores information about network resources across a domain. An example of a directory service is Active Directory. The main purpose of Active Directory is to provide central authentication and authorization services for Windows-based computers. Active Directory also allows administrators to assign policies, deploy software, and apply critical updates to an organization. Active Directory stores information and settings in a central database.

An Active Directory structure is a hierarchical framework of objects. The objects fall into three broad categories: resources (e.g. printers), services (e.g. e-mail) and users (e.g., user accounts and groups). The Active Directory provides information on the objects, organizes the objects, controls access and sets security. Certain objects can also be containers of other objects. An object is uniquely identified by its name and has a set of attributes—the characteristics and information that the object can contain—defined by a schema, which also determines the kind of objects that can be stored in the Active Directory.

Typically, the highest object in the hierarchy is the domain. The domain can be further subdivided into containers called Organizational Units. Organizational units give a semblance of structure to the organization either based on administrative structure or geographical structure. The organizational unit is the common level at which to apply group policies, which are Active Directory objects themselves called Group Policy Objects. Policies can also be applied to individual objects or attributes as well as at the site level (i.e., one or more IP subnets).

The present invention may use one or more communication networks to foster information exchange throughout the computers of the ecosystem. Communication networks might either be private or public. In a private network, communications between multiple computers occur in a secure environment that prevents access from outside the network without appropriate authentication. These networks are considered as "trusted" networks because the communication signals securely travel from one computer to another within the private network without being exposed to the external environment.

Public networks such as the Internet, on the other hand, are not secure because the communication over these networks is not private and is susceptible to interception by other computers. In addition, the public networks cannot guarantee the delivery of the data packets being sent. They allow packets to be injected into, or ejected out of, the networks indiscriminately, and analyzed while in transit. To keep data sent over a public network private, a Virtual Private Network (VPN) is commonly established on top of a public network when two computers use the public network to communicate with each other. In a Virtual Private Network, data sent from one computer to another is encrypted by a security gateway and transmitted in encrypted form over the public network to a second security gateway connected to the receiving computer. The second gateway decrypts the data before forwarding it to the receiving computer. Such a private channel established on top of another network is referred to as a network tunnel.

In order to set up a Virtual Private Network, a user first establishes a path to a VPN server and goes through an AAA process (Authentication, Authorization and Accounting) for identification and authorization to create a secure tunnel with the server. Once the user is authorized, a secure network tunnel is established between the user and the VPN server over the public network, using a VPN protocol such as IPsec. This process requires a VPN client on the user's side, a VPN server and other VPN hardware on the other side of the tunnel, as well as appropriate user configurations.

Today's private networks often include wireless networks such as WiMAX to accommodate mobile access. In addition, to provide mobility access in a large geographic area, a private enterprise often relies on third-party wireless infrastructures besides its own wireless network. In this case, a user's device would need to be authenticated by both a third-party gateway and an enterprise authentication server before it could access the enterprise network. User credentials are typically requested by and securely returned to the third-party gateway. Once the user is authenticated and authorized, the user may communicate with the third-party wireless gateway.

The present invention includes files 708, which may include executable instructions 170 by which the present invention runs, or files upon and with which the present invention interacts. The documents may be on local storage 704 or shared storage 730 and be created, accessed, edited, and/or otherwise modified using any of a number of applications, including for example and without limitation Final Cut Pro, Avid, Microsoft Office applications (Word, Excel, Power Point, Outlook, Visio, etc.), Adobe Reader or Acrobat, AutoCAD, SolidWorks, or any other suitable document editing application. The content of the documents may be audio tracks, video clips, images, word processing documents, presentations, spreadsheets, business documents, engineering documents, databases, etc.

Returning to FIG. 1, the computer 702 includes a touch digitizer 140, which is often merely incorporated into the display 106 as a "touchscreen." Touch digitizers as of the drafting of this disclosure use capacitive touch sensors as opposed to the resistive touch sensors. The capacitive sensing digitizer layer most often uses projected capacitive touch (PCT) technology, which sees the materials used in the detection etched into the layer as a grid. This grid projects an electrostatic field when a voltage is applied, and when a human finger, which is electrically conductive, touches the area covered by the grid, the electrostatic field is altered. A controller then determines the position of the finger based on sensors and other components.

As the electrostatic field of PCT displays can only be altered by conductive materials, human skin affects the display but materials commonly used to fabricate clothing, fashion accessories, and personal items do not. The field generated by the touch digitizer is three-dimensional, which allows conductive items to alter the field notwithstanding the potential existence of nonconductive barriers, e.g. clothing. Touch screens are often capable of being transparent, or nearly so, because the material commonly used in their manufacture, indium tin oxide, is transparent. The grid is constructed from a series of small capacitors positioned at the grid intersections which allow for mutual capacitance, which in turn provides multi-touch. With LCD displays the touch digitizer layer is placed above the liquid crystal layer but below the final glass protecting layer. With some AMOLED displays, specifically Super AMOLEDs by Samsung, the digitizer is actually integrated into the same layer as the organic light-emitting diodes, making it essentially invisible while consuming less space. Often the protective glass, digitizer and display itself are all attached tightly together in the one panel to reduce the chance of glare and reflections while saving space.

Returning to FIGS. 1, 6 and 9 the storage 730 of the computer 702 of the present invention includes machine readable instructions 170 for the Distress Routine. The Distress Routine includes multiple aspects including a user profile. A primary benefit of the present invention is that it permits a fast, simple way to communicate the existence of a dangerous situation location to an emergency assistance provider by transmitting one of the following: current GPS location and/or pre-loaded user profile information and/or continuing to connect the now confirmed intended Distress Signal to a campus, municipal, state or federal emergency assistance provider. The user can be any of the entities described in the present disclosure, sentient or not. In many instances the user will be an organism, e.g. people, pets, guard/sentry animals, etc.; and in other instances the user will be a computer, e.g. an automated teller machine, or object having access, or physically attached, to an ALU, e.g. art, guarded movable (such as gems), cars, etc.

Often during an emergency, a person can not effectively communicate relevant information because of existing circumstances or disabilities: whether related to time, saying they do not know the address of their current location (perhaps because GPS got them there), when danger is close-by or in the next room, medical problems, speech or hearing difficulties, language proficiency barriers, conspicuousness or plain straight-out inability (e.g., hostages, domestic violence, child abuse, fear-freezing) to explain the need for authorities to come for an emergency at a specified location. A user configures 302 preloaded information. This information may include phone number, name, gender, age, race, medical history, occupation, residence, additional contact information, emergency contact, vehicle information, family members and profiles, pets, etc. Additional information may include captured information. Captured information may include information that can be captured by an electronic device based on the user's use of the computer or another electronic device. Examples of captured information include geo-location, phone number, temperature, elevation, direction, browser (or other user-agent string information), IP address, sound, video, Internet history, software history, etc. This information can be transmitted to an emergency contact. Other information may include pre-recorded messages, e.g. a voice recording. Furthermore, configuring 302 may include any aspect of loading, installing, or otherwise preparing the Distress Routine.

The present invention acquires 312 emergency contact information for an emergency services provider. An emergency services provider includes any service that may be provided to a person, entity, or property to prevent a potential threat to the existence or well-being of the person, entity, or property. A preferred example of an emergency service provider includes a policing agency, such as a municipal police department, federal policing agency, county sheriff, highway patrol, or state police; and security such as Military Police, Military base security, college campus security and private company security as well. Many of these policing agencies have emergency contact accessible to the general public to provide emergency service. A policing or security agency should be notified in the event of criminal activity. A preferred example of an emergency service provider includes a medical services provider, such as a primary care physician, hospital, EMT service. A medical service provider should be called in the event of a medical issue. Other types of emergency service providers include poison control, fire departments, animal control services, etc. There are often instances when emergency service providers need to be called quickly and discreetly.

By acquiring 312 the present invention may utilize multiple acquisition pathways. A first pathway includes storing contact information in an internal database in storage 730 from which no external communications are necessary. Loading contact information may be included in the configuring step 302 of the process 300. Contact information may be manually entered for any emergency service provider, including primary and secondary service providers for a single category. By primary and secondary it is meant that there may be a preferential order of service providers that may be functionally manifested through a contact process communication order (e.g., first the primary service provider, then the second service provider), a communication type (e.g., SMTP for primary, and pre-recorded telephone message for secondary), etc. Contact information may be preferred and acquired by the invention on the basis of geographic location, time of day, or other variable. Contact information may be acquired 312 from a LAN or a WAN. Contact information can be acquired from a trusted third party provider, including white pages, yellow pages, blue pages, and other contact information service providers supplying information over a WAN. The present invention may use the geolocation data acquired 312 by the computer 702 compared with metadata related to emergency contact information.

To facilitate the notification of emergency service providers, the present invention exhibits a graphic overlay 120 that is part of the initiation 306 of a transmission to one or more emergency service providers. The preferred graphic overlay 120 is a two-dimensional graphic overlay, graphically exhibited on the computer display 106. The graphic overlay has a graphic path length and path direction variable in two-dimensions, whereby an uninterrupted physical trace along an alarm path length of, and co-extensive with, said graphic overlay answers a solution that initiates said distress signal. The graphic overlay presents a graphic puzzle that can be solved by a user by tracing part or all of the graphic overlay. For example, the graphic overlay of FIG. 1 is a circle, a user traces the circle as depicted as the graphic overlay on the display in order to create the solution that initiates the distress signal transmission.

Figure 2:
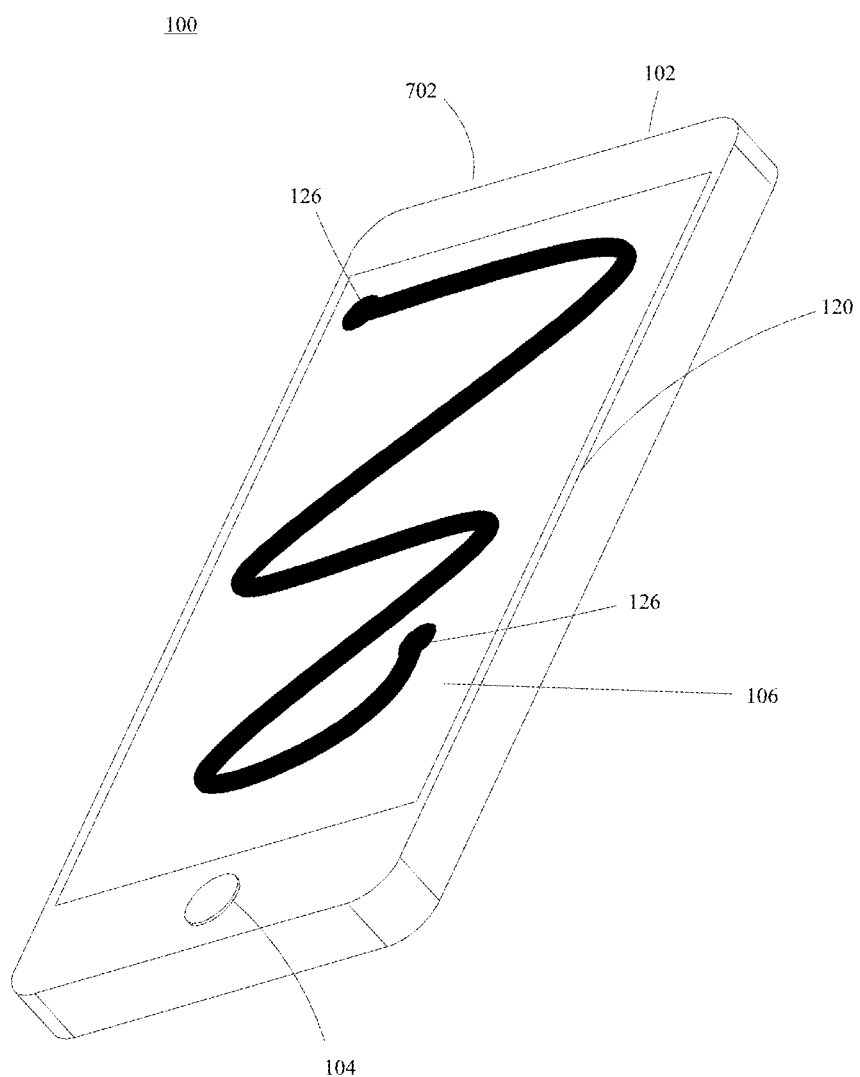
FIG. 2 is an orthographic view of the present invention.

As shown in FIG. 2, the graphic overlay 120 may take any form in keeping with the spirit and intentions of the present invention. The preferred graphic overlay includes a substantial length to ensure purposeful initiation of the distress signal. The graphic overlay therefore includes a path length, i.e. length from one end to the other, or in the case of a continuous shape, the length from a start point up until the return to the start point, at least 25% of the width or height of the display 106, and more preferably at least 100% of the width or height of the display. To further ensure purposeful initiation of the distress signal, the graphic overlay includes a shape that varies in two-dimensions. In other words, the shape is both not a straight line and not orthogonal to the perimeter lines of the display rectangle. A preferred graphic overlay includes multiple changes in direction, and more preferably abrupt.

The graphic overlay may be traced while exhibited 304 to the user on the display 106, and if so, the complexity of the graphic overlay may be more so than in situation wherein the graphic overlay is not exhibited 304 to the user at the time of the trace. The graphic overlay of FIG. 2 is an ideal shape for physical trace while exhibiting 304 to the user. The abrupt changes of the squiggly line are not easily subject to memorization; however, the abrupt changes all but ensure that a user intends to physically trace the graphic overlay and thereby transmit 308 the distress signal. The graphic overlay of FIG. 1 is ideal for situations whereby a user may trace the graphic overlay without the graphic overlay being presented to the user at the time of trace. For example, the Distress Routine of the present invention may present a blank screen to permit discreet transmission 310 of the distress signal. Exhibition 304 of the graphic overlay may be presented to a user at the time of configuring 302 of profile information, and perhaps shown to a user for a predetermined test period, but hidden from view during the initiation 306 step.

The graphic overlay may be exhibited during any meaningful time. It is preferred that the exhibition occur during once a discreet program is accessed. In such a scenario, the graphic overlay is depicted during the potential emergency situation without other programs and elements thereof appearing simultaneously with the graphic overlay(s). The graphic overlay may also be available in a more passive state as an indefinitely displayed, or indefinitely available in instances where the graphic overlay is not displayed during tracing thereof, backdrop to a home screen. A home screen for the present invention is a state of a computer operating system whereby access to multiple programs may be achieved from a versatile starting point. Exhibition of the graphic overlay(s) may occur during application of a screen saver or other program that includes sizable decorative features. In such cases, the graphic overlays may be camouflaged within or nearby other graphics. The graphic overlay may be in motion and only sedentary upon the user's contact with the screen.

The graphic overlay may change over time and with or without notice to the user. When the graphic overlay is exhibiting during predetermined time periods, for example, the user really need only be aware that there is a graphic to be traced rather than a particular graphic. In a screen saver whereby multiple graphic are sequentially depicted, the tracing of any of the graphics may lead to the initiation step. The graphic overlays may be characterized in terms of general properties. For example, closed shapes may contact policing departments, lines may contact fire departments, etc. The general properties may be based on any of the decisions of the present invention such as category, geography, etc.

Turning now to FIG. 3 and FIG. 4, the preferred graphic overlay 120 may include an alarm path length 122, a direction indicator 124, and boundaries 126. The alarm path length 122 provides a traceable path superimposed on the graphic path length that need not be the entire length of the graphic overlay path, or may be greater than the graphic overlay path because the alarm path length 122 reverses direction and contacts the same point of the graphic overlay path multiple times. In the preferred graphic overlay of FIGS. 3 and 4, the graphic overlay imitates a combination lock where the boundaries act as a start point and end point for the "turns" of the combination lock face. When the user reaches one boundary 126, then the other boundary 126 may alter to indicate the next point of the combination lock turn. The direction indicator indicates the direction in which the finger may be moved. When the appropriate number of turns at the appropriate points along the graphic overlay have been reached the distress signal may be transmitted 308. The combination embodiment of the present invention is particularly suited for embodiments whereby the graphic overlay may be hidden during the initiation step, or the graphic overlay may be exhibited during the initiation step while the boundaries and direction indicators are hidden (but the boundaries and direction indicators exhibited in an earlier viewing of the graphic overlay), or a false graphic overlay and/or false boundaries and direction indicators are exhibited.

Turning now to FIG. 5, a portable tablet computer 700 is depicted. The graphic overlay version of FIG. 5 indicates a fragmented graphic overlay. The fragmented graphic overlay includes at least two portions, a discontinuous portion 120*a* and a complementary portion 120*b*. A user drags the complementary portion 120*b* to the discontinuous portion

120*a* to complete the graphic overlay, and upon completion of the graphic overlay, the distress signal may be transmitted 308.

Figure 6:
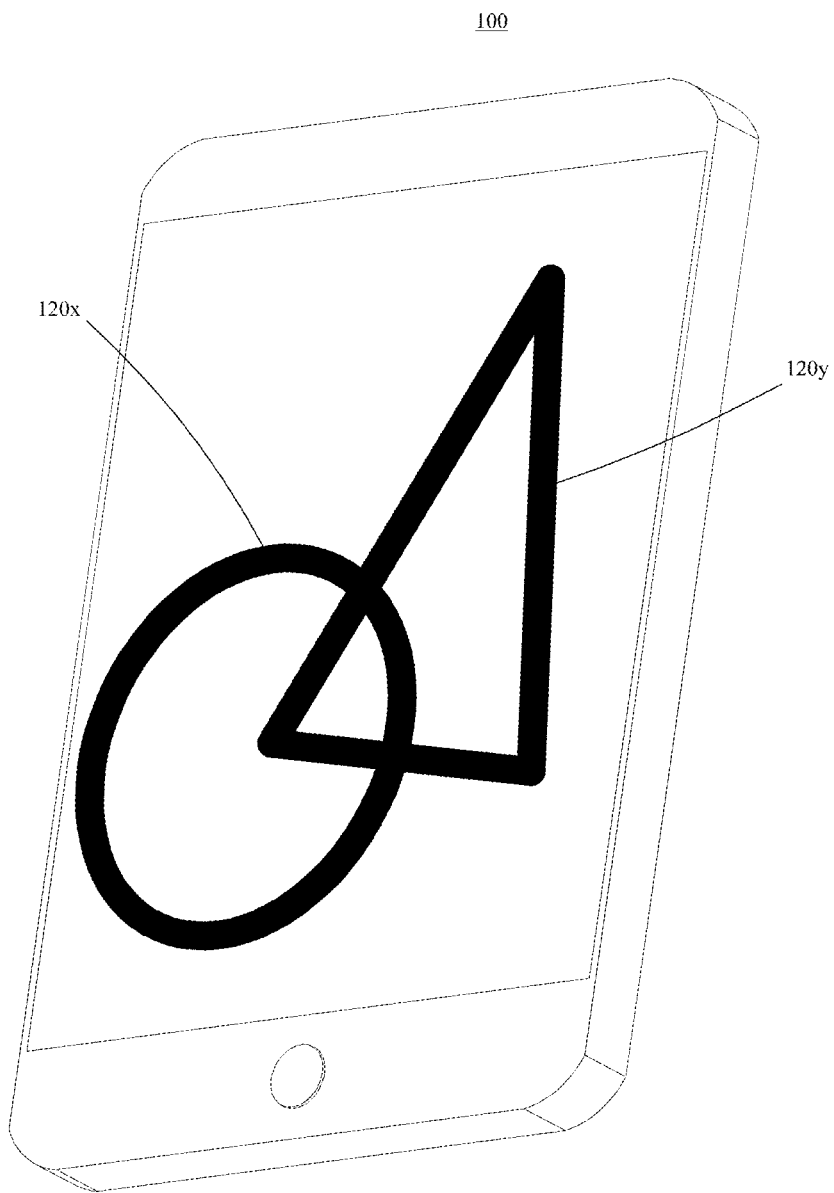
FIG. 6 is an orthographic view of the present invention.

Turning now to FIG. 6, the present invention may include two or more graphic overlays 120*x*, 120*y*. The graphic overlays may be exhibited simultaneously, or sequentially during a discreet setup period or during the initiation step 306. One graphic overlay may confirm you are intending to connect the confirmed Distress Signal. One graphic overlay sends only the location of the device to emergency service providers. One graphic overlay may be associated with a discreet set of user profile information, while another graphic overlay may be associated with a second set of user profile information. One graphic overlay may be associated with a discreet emergency service provider contact, while another graphic overlay may be associated with a second emergency service provider contact. One graphic overlay may be associated with a discreet emergency category, e.g., fire, while another graphic overlay may be associated with a second emergency category, e.g. crime. The graphic overlays may be exhibited together with one graphic overlay colored differently from the other, or whereby one graphic overlay includes a distinct shape. The graphic overlays may be differentiated in any meaningful way and they can vary as well to prevent hacking.

The preferred transmission 308 divulges the device's geolocation and phone number if applicable and indicates it is an emergency to the emergency service provider. A user may supply any number of emergency categories to one or more graphic overlays. The emergency categories may be logically subdivided into any number of divisions, including "general," "bystander" "crime," "fire," "poison," "medical," or other. These categories may or may not be divulged to the emergency service provider electronically directly and expressly. By directly, it is meant that the category is indicated to the emergency service provider in some manner whether visually or orally. By expressly, it is meant that the category is unaltered whereby "crime" is shown to the emergency service provider on a screen or audibly communicated. The category may also be indirectly divulged or altered. By indirect, it is meant that the category is communicated in some manner other than express, and by indirectly, it is meant that the category is communicated indicative of the category, for example, indicating a genus (e.g., "fire" or "ambulance") or species (e.g. "possible sexual assault") of the category.

The transmission 308 may be by any means known in the art to communicate an emergency to an emergency service provider. Preferred versions of transmissions include http transmission, telephone call, text, instant message or SMTP communication. The transmitter 150 may include telephone antennae, a modulation/demodulator, or other means for transmitting electromagnetic signals.

The present invention acquires 312 emergency contact information. The acquisition may be static whereby the user supplies emergency contact information for any emergency service provider related to one or more graphic overlays. The acquisition may be dynamic in that the emergency contact information is derived from an external database on or about the time of transmission 308 to ascertain the nearest logical emergency service provider. The dynamic means of acquisition may be preferred in such instances when a user has changed his/her location. The dynamic acquisition may take multiple forms including bypassing a static acquisition, or using a combination of static acquisition and dynamic acquisition whereby the acquisition step 312 includes at least comparing the statically acquired contact information to a recommended contact information based on a search of localized emergency service providers.

Figure 10:
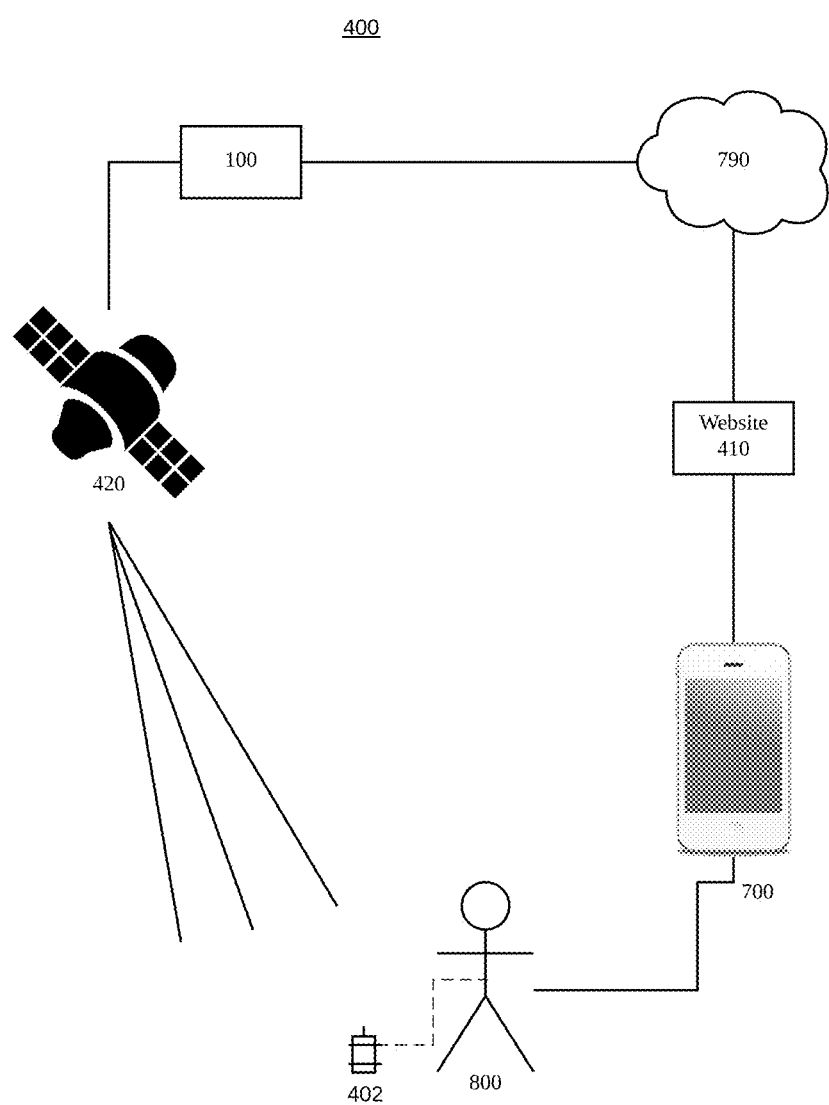
FIG. 10 is a view of a system of the present invention.

As shown by FIGS. 9 and 10, the present invention may further include a system 400. The system includes the computer of the present invention along with a position indicator 402. The position indicator 402 is carried by a user 800 and sought 310 upon transmission of the distress signal. In many instances, the computer 700 of the present invention may be discarded by the user or a hostile actor, or the user may gain later access to a computer. In the case of the former, the computer is used to configure the Distress Routine 302, exhibit the graphic overlay 304, initiate 306 the distress transmission while the position indicator is sought 312 rather than the computer. In the case of the latter instance, the system 400 may include a computer not owned by the user being sought. Instead the graphic overlay may be exhibited via an http transmission over a WAN 790 to a computer to which the user merely has access. The user may solve the graphic overlay to transmit 308 the distress signal. In instances whereby the graphic overlay may be obscured from general observation, but perhaps not to the user being sought, the graphic overlay may be integrated within the alphanumerics of a website 410. For example, a user may trace the headings of a news article of a website purposefully created for a user to access during a period of distress, or a user may trace shapes on a phony advertisement on the website. The website may be configured to run as a subroutine the graphic overlay exhibition 304.

The position indicator 402 of the present invention may include any device capable of being electromagnetically queried as part of a passive/active transmission system or actively transmit data identifying the user. It is further preferred that geolocation data be supplied by the position indicator 402 or a transmission from the position indicator, e.g. signal triangulation. When a passive transmission system is utilized, an interrogation device 420, e.g. a satellite, cellular tower, or RFID signal generator, broadcasts a response signal. Circuitry in the position indicator accepts the broadcast, which it then utilizes to power a return broadcast. Passive transmission systems are preferred because a power source is not necessary, and a return (and potentially concealment-ending) broadcast is provided only at meaningful times. Active transmission units may be utilized when a constant or periodic transmission may be utilized without harming the user.

A user may be acquired, for example, as a hostage, or as a domestic or child abuse victim. The user who has already performed the configuration steps of the present invention may access a computer terminal 702, irrespective of ownership. The user may have a specialized url, known only to him or her, that can be accessed over the Internet. The specialized url includes the graphic overlay of the present invention, and the user's solution of the graphic overlay can alert an overseeing body to the status of the user, and with recourse to the position indicator, locate the user. The graphic overlay can include multiple solutions related to multiple categories of harm, e.g. "hostage" or "successful infiltration" or "infiltration with need for extraction." Contact information should be pre-loaded to include the overseeing body, or perhaps a subunit thereof capable of affecting the category of need of the user. Because the graphic overlay may be hidden or seem insubstantial, transmissions may be generated in plain site of hostile actors or abusive partners in many circumstances and through any computer.

Figure 11:
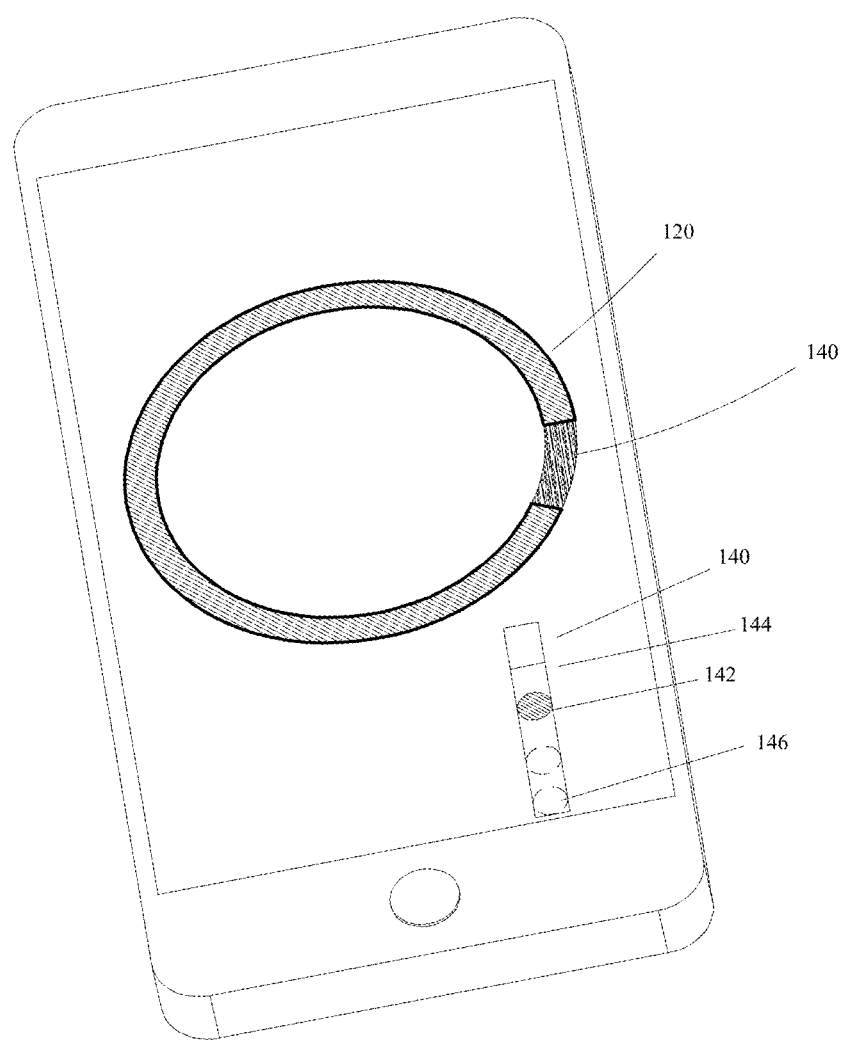
FIG. 11 is a view of a system of the present invention.

Turning to FIGS. 9 and 11, the present invention may further include a sub process for obscuring 314 any indication that a transmission was sent. The obscuring step 314 may include global and specific steps to minimize any indication of a transmission or the graphic overlay, or other aspects of the present invention that are visually ascertainable. By minimization, it is meant some action has been taken that makes it unclear that the present invention has been utilized. This may be because traces of the present invention have been erased or hidden to make actions taken by the present invention not immediately apparent. By specific steps, it is meant steps practiced by invention to obscure transmission indicia brought about by the process itself. Indicia brought about by the process include the graphic overlays, indications of successful transmission, visible user information, etc. By global steps, it is meant steps practiced by a computer irrespective of the presence of the invention, including general settings of stored telephone numbers that have been dialed, confirmation receipts of access to emergency service providers and the like.

In the preferred embodiments, a user in an emergency can activate the graphic overlay corresponding to the emergency service desired. The graphic overlay may appear, and the user may trace the shape of the graphic overlay. The graphic overlay then disappears without any indication that the graphic overlay appeared or that the computer contacted another entity. Dangerous situations may often be created because a hostile actor knows of a victim's attempt to seek assistance. Because the present invention may immediately obfuscate any aspect of the program's use (specifically), or the computer's use of the program (globally), the present invention injects another layer of safety.

The obfuscation may be automatic (such that no further actions are required and the obfuscation occurs immediately upon some other action), or the obfuscation may be selected by use of an obfuscation trigger 140. The obfuscation trigger may include any means of interaction with the computer that allows a brief physical motion to impart the desire to obfuscate. A preferred means of obfuscation includes the use of an augmented graphic overlay. By augmented graphic overlay it is meant that a portion of the graphic overlay 120 is reserved for trace to indicate that the use of the invention is to be obfuscated subsequent to use. By way of example, the first 80% of a graphic overlay 120 may be used as the basis of indicating the desire to engage in a transmission to an emergency service provider, whereas the second 80% of a graphic overlay, as the trigger 140, may be used as the basis of indicating the desire to obfuscate the use of the invention. A user who merely traces the first 80% of the graphic overlay indicates that they want to utilize the transmission of the present invention without the obfuscation. A user who traces 100% of the graphic overlay, or perhaps even some number between 80-100% of the graphic overlay, the user indicates that they wish to activate the transmission of the present invention along with the obfuscation.

Alternatively, the trigger 140 may comprise a separate entity that allows indication of obfuscation in connection with the trace of the graphic overlay. The trigger, for example, may include a trigger activator 142 that begins in an initial position 146 that requires a user to move the activator along a path to a designated trigger point 144, whereby once the activator passes the trigger point, the invention understands that obfuscation actions are to be taken.

Simply because the invention is obfuscated does not require the obfuscation to be permanent. The obfuscation may be timed to prevent merely the timely review of the computer for indications of the present invention. The most likely time for an aggressor to review the computer for indications of transmission are immediately subsequent to physical activity upon the computer; therefore, the obfuscation may be timed to expire and reveal activities specific and global related to the use of the present invention, and all actions related thereto.

Figure 12:
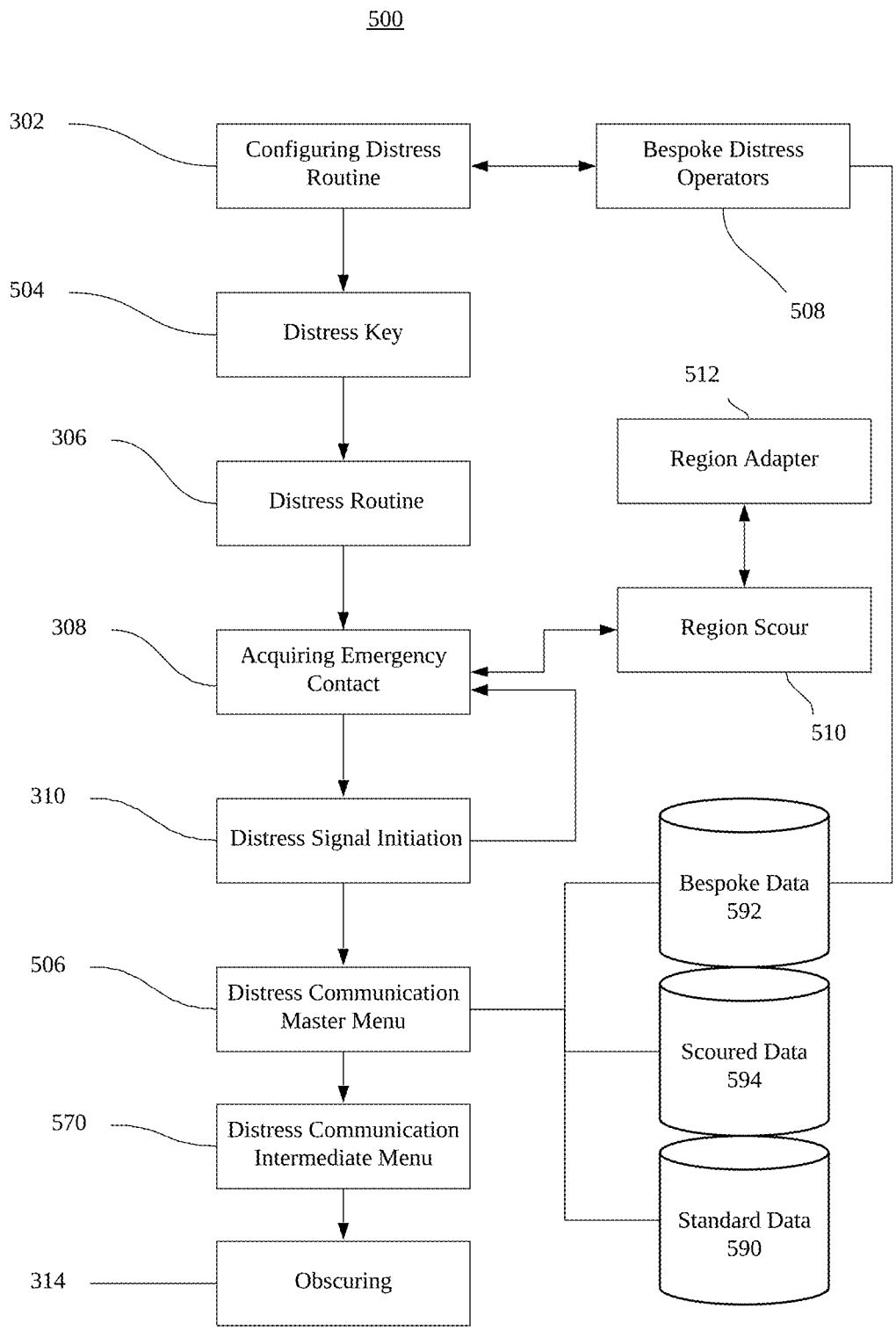
FIG. 12 is a view of a system of the present invention.
Figure 13:
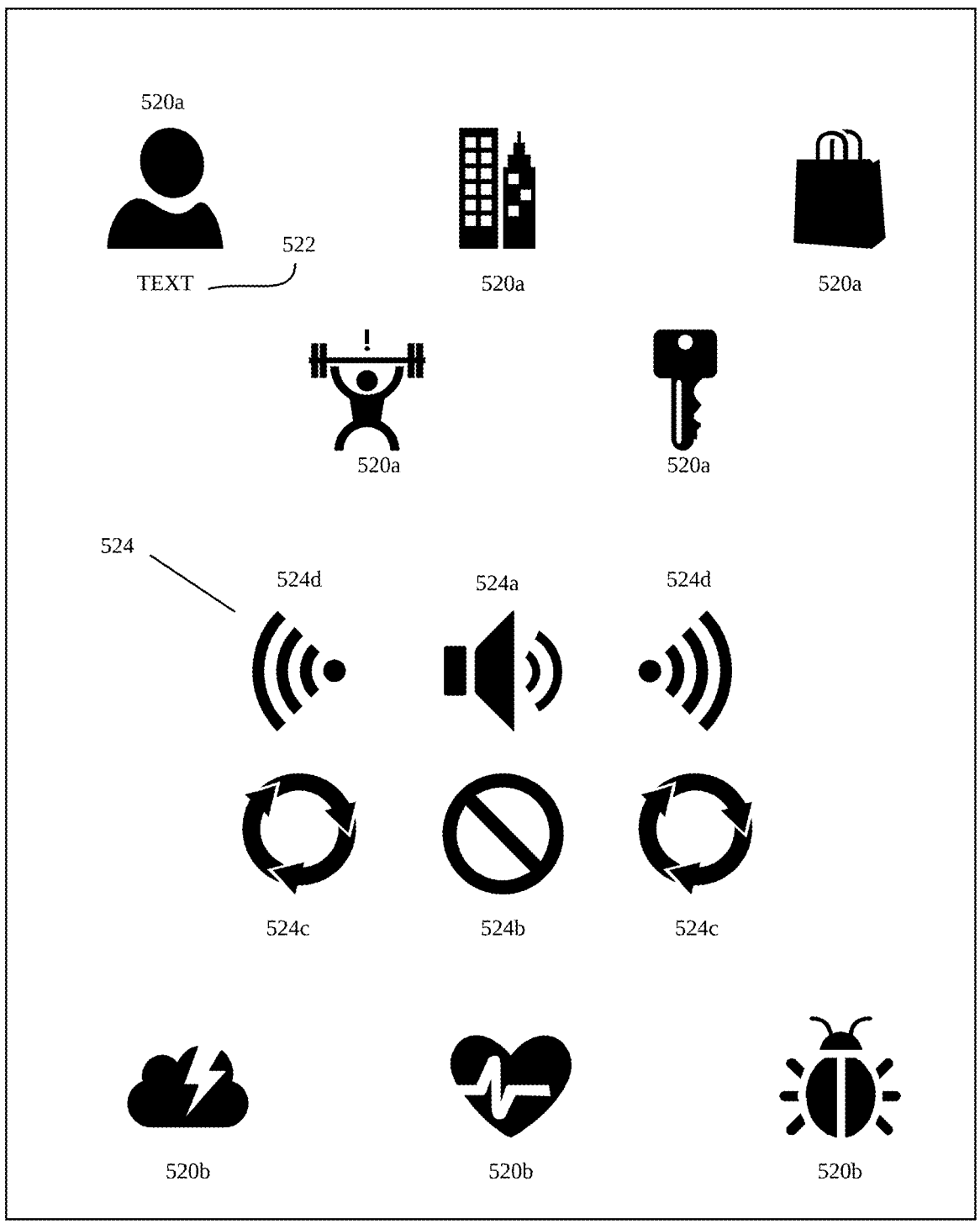
FIG. 13 is a view of a system of the present invention.

Turning now to FIGS. 12 and 13, the distress transmission device 100 features interactivity that facilitates communication by the disabled. It has always been an ordeal for the disabled to communicate needs and desires to service providers; when those service providers include emergency personnel, the situation becomes more dire. The present invention includes aids adapted to permit facile communication by the disabled, but also more efficient communication by the balance of humanity, particularly when in situations whereby physical or mental processes are diminished. It is a common thread that those seeking aid from an emergency service provider will have some form of diminished capacity or capabilities, arising either from the emergency or the most efficient way to cope with such an emergency. For example, the inability to speak during an emergency can be presented in the form of: (i) a mute individual lacking the physical capability of speech, but also to (ii) a normally verbose individual contemporaneously suffering from neck muscle tension resulting from the ingestion of a toxin, as well as to (iii) a kidnap victim seeking the aid of police.

The distress transmission device 100 may include the configuration 302 of prior embodiments, however, the inclusion of bespoke distress operators 508 adds to the functionality of the present invention. By bespoke distress operators 508 it is principally meant the subroutine of providing a function for a user to pre-configure to his satisfaction two types of actions: (1) a tailored means of initiating a process or subprocess, and (2) the entry of data and information tailored to the user. More than these two may be utilized to the extent that user desires such and to achieve the purposes and objectives of the present invention. These specialized functions will be discussed in greater detail later and subsequent the discussion of their more-generalized versions.

The device 100 operates similar to prior versions by operation of a distress key 504. The distress key 504 is meant to be the gatekeeper for the program that starts the chain of events that results in the eventual transmission of the distress information. The key, therefore, is the credential or set of credentials presented by the user that allows continuation of the transmission process. The credential(s) is/are meant to be purposeful and uncommon. The present invention may utilize the trace earlier disclosed in this patent document, which as a logical puzzle of sorts, necessitates the dedication of not insubstantial mental resources to continue the distress transmission. Therefore, such a trace necessitates a purposeful act of the hand and mind. In embodiments of the present invention targeting the disabled, the use of traced shapes and other puzzles may not be advantageous. Forms of arthritis or muscle conditions may make shape-tracing problematic or even impossible; furthermore, depending on emergencies that may be encountered by the user, even perfectly healthy individuals may be incapable of tracing a shape on a screen. Forms of the present invention targeting the disabled may even be preferably lacking a key that involves any form of physical interaction with a screen beyond the slightest contact with the screen or computer. The preferred key of the present invention includes either a dedicated physical key, virtual icon or button, or sensory interaction with the computer.

The computer of the present invention will often be in the form of a smartphone, which tends to include one or more accelerometers, audio inputs, and visual inputs. For the purposes of the present invention, the ability to move, accept audio, and accept visual will be considered inputs of the senses. These sensory receptors, that have the ability to detect movement, light waves, and audio waves, can be used to detect senses that can in turn to be used as initiators for actions. One of the distress operators of the present invention includes a means for associating sensory input to action initiation. A primary form of action initiation is as a key for the eventual distress transmission. A key should be uncommon and purposeful, and sensory inputs for accessing and consummating a distress signal should fits these characteristics as well. The three primary forms of sensory input applicable to the present invention may be used as a key.

When the audio inputs are intended to be used as a key, the user can access the bespoke input operator 508. The operator 508 can present a list of options applicable to potential keys, including an express reference to vocals or other audio. It is preferred that vocals be used on as the preferred audio key because a voice is something that a user tends to always have available. One or more audio keys may be utilized, and even different keys for different pathways through the distress transmission process. For example, a particular form of cough may be used to access the common, subsequent steps of the present invention; however, a rape whistle, which is an ever-present companion for some women leaving in urban areas, may be used as a general key—or as an instant key that leads directly to a distress transmission to a policing emergency authority that immediately conveys the user's status as in jeopardy of being raped. The rape whistle can be the sole key of the present invention, or one of multiple keys. A rape whistle would make an admirable key because it sounds at an uncommon frequency, but also the whistle requires a purposeful action on the part of the user. Other sounds considered suitable for the present invention include: screams, coughs, whistles, and unusual words or phrases. The words and phrases, and coughs, would require considerable forethought in order to ensure that the device 100 is not accidentally triggered. A key aspect of the present invention is to diminish false transmissions to emergency agencies, and a key that results in false positives would counter many of the important goals of the present invention. The operator may be coupled with a detractor, stored with the audible key or a master detractor that counters all audible keys. The detractor, which can be any of the sensory inputs or a more-conventional computer feature, e.g., a large virtual cancel button occupying a substantial portion of the computer screen. A cough of one frequency or volume may provide the key, and if not counteracted by a detractor whistle of particular frequency or volume, the key is validated and the process continues. Any attribute capable of being measured may be a key or detractor.

Multiple actions can form the basis of a distress key of the present invention, including being one of a combination of keys for any other activity contained within the specification (or other similar activity in spirit). An example of a prior activity mentioned by the present invention includes using the shape tracing features described herein to act as a distress key. Furthermore, an alphanumeric code or other information factor can be supplied as a distress key. However, it is preferred that the present invention rely on more unorthodox forms of a key.

A contrived noise purposefully manufactured for the purposes of serving as a distress key may be utilized with the present invention. Any form of activity that can be detected by a device as input may be utilized. A first example of contrived, repeatable noise includes a fake laugh substantially different from the normal laugh of the user. A laugh is an ideal distress key because a laugh could fit into a social situation in which an undesired interaction may be about to occur. Often, undesired interactions escalate from conventional, permitted interactions rather starting as an abrupt circumstance. A fake laugh could be inserted into a conversation with one or more individuals without identifying that a distress signal has been initiated and/or that a distress transmission is in process. Furthermore, a cough could be used as a distress key because a fake cough is capable of simplistic repetition and fits within most social settings. Furthermore, a simulated medical scenario could be a distress key, particularly with information concerning the circumstances of the potential medical scenario programmed into the distress menu permitting a user to merely utilize a menu to summon help specifically tailored to the medical circumstance. Many medical scenarios includes actions, or forbearance, (all "activities") that are capable of manifesting an intention of initiating a distress transmission. Many medical situations can result in noises reliably reproducible, including breathing patterns.

Inaction can be a form of initiating a distress transmission, including a certain period of dormancy that results in a finding of need of medical attention. The inaction can be strict, such that purely inactivity is measured, or the inactivity can be tied to another variable such as the time of day. Inactivity during the nighttime may be normal, but inactivity during the day may be a sign of need of medical attention. The additional variable may be tied to a geographic location; there may be a location where activity is negligible such a bedroom or even an entire house. Inactivity for a period beyond a certain area may trigger the distress signal. The present invention may be tied to a physical monitor of health attributes, e.g. a constant monitor of heart beats whereby a heart rate failing to meet specific criteria may result in perfecting a distress key. Examples may include high heart rates, low heart rates, or even absence of heart rate.

Certain distress key activities can include extreme sounds, such as screaming. The screaming can be based on volume, frequency, or some other measurable attribute. Other preferred sounds may include onomatopoeia, such as animal sounds (e.g., "Meow") or action sounds (e.g., "BAM!"). Other words are capable of use as distress keys, yet there need be an understanding that the word or phrase be an anomaly for the person bearing the device. Devices capable of facial recognition may detect unusual facial expressions as a distress key, such as faces indicating distaste. Facial expressions suitable for a distress key necessitate reproduction during the situation that would necessitate its remedy.

Motion may be used as a key of the present invention. As a principle vehicle for the device of the present invention includes smartphones and other portable electronic devices, the computer may be motioned to provide the key. Preferred forms of motion include vigorous agitation for a pre-determined period of time, or dedicated movement of the computer in a pre-determined pattern. Similarly, detractors may be in similar form or more conventional computer processes, e.g. virtual or physical buttons. The distress operator 508 is capable through the use of accelerometers and memory is capable of following and memorizing motions in multiple dimensions and multi-dimensional patterns. For example, a the trajectory of a cross path, or a letter 'L', or circle can be recognized and memorized as an operator key. For more crude gestures, e.g. agitation, the screen can display a meter or other gauge that indicates when the appropriate amount of agitation occurs in real-time. So, for example, for ten seconds of randomized agitation as a key, the screen may include a gauge that after two seconds includes a bar 20% of the gauge height, at five seconds 50% of the gauge height, and at nine seconds 90% of the gauge height, and so on. To aid the computer, a toggle may indicate whether the user intends the predetermined key to be randomized or a particular path. For instances where the path does not matter, the degree of agitation e.g., speed of frequency of agitation or force of agitation may be measured for future use a key. Any type of motion, or attribute of motion, capable of being measured may be utilized as a sensory operator key.

As is particularly applicable to the motioning key, the present invention further includes a replication engine. The replication engine of the present invention is adapted measure such attributes of the potential sensory key as are measurable or desired to be measured. When the user is pre-configuring the bespoke distress operator to accept a tailored sensory initiator, the operator may ask the user the particular type of sense desired to act as the key; and further refined based on the type of sense. For example, for the motion sense, the operator may further seek to ascertain whether the user desires one or more of the following: path, degree, length, duration, etc. The recording of the act begins and the user applies the motion sense that he desires to be the key. Then the replication engine asks the user to perform the motion sense (or other sense) again, or repeatedly. The replication engine not only measures the attributes of the motion (or other sense) both also then acts as a comparator in relation to the original motion (or other sense) offered by the user as the key. There are multiple actions that can then occur. First, not all senses are suitable for use a key and the replication engine is adapted to aid a user in discerning this. One basis for rejecting a sensory motion is a lack of repeatability. Several conclusions can be learned: one of which is that a key motion may not be suitably repeatable with any accuracy. An action that is not repeatable with a high degree of certainty in a crisis situation is a concerning circumstance, and the replication engine exists to reject a user's proposed key or inform a user as to the situation to allow a user to consciously consider whether to utilize a new key. Alternatively, with one or more proposed mimics of the key motion, the replication engine can discern the degree of difference between the various key motions offered during the input phase. The engine may learn that a motion is often performed with a +/−5 centimeter accuracy, and the engine may discern such accuracy to be suitably repeatable. Furthermore, the engine may take the multiple key actions and mimicry and extrapolate a mathematical average, mean, or other phantom version that is used to judge future the compliance and relationship of the distress initiation motion to the stored key motion. Although it is preferred that the present invention include default repeatability guidelines, the repeatability issue can be left up to the user via either adjustment of tolerance of the replication engine or outright denial of the suggested proposed key. What the engine may understand is that the repeatability of a proposed key may be too difficult to replicate with a predetermined acceptable accuracy. For example, an intensity of scream may not be repeatable except with a variance of +/−5 decibels, and as a general principle, such a deviation may not be acceptable. However, for a naturally quiet person seeking an intense scream to be a proposed key of approximately 100 dB that can only be repeatable at approximately +/−8 dB may be acceptable because such a person rarely makes an utterance over 40 dB. This may be true of exaggerated gestures as well. So, the present invention may be capable of indicating to the user that the repeatability may not be within an appropriate range, but the user may nonetheless proceed to adjust the acceptable range of repeatability with knowledge of the potential for false positives. Of course, the potential for false positives increases, dependent upon the person; however, the present invention can ameliorate the potential for false positives through the use of checks. For example, an intermediate menu 570, which is any menu subsequent to the master distress menu 508 may include a capability to negate the transmission or the distress signal initiation 510 itself may include negation. Furthermore, the distress key 504 may include two portions, or some form of bifurcation, whereby a second action may validate the process for seeking emergency assistance.

The distress routine 306 may include any of the distress routines subparts as previously discussed in this disclosure. A user configures 302 preloaded information. This information may include phone number, name, gender, age, race, medical history, occupation, residence, additional contact information, emergency contact, vehicle information, family members and profiles, pets, etc. Additional information may include captured information. Captured information may include information that can be captured by an electronic device based on the user's use of the computer or another electronic device. Examples of captured information include geo-location, phone number, temperature, elevation, direction, browser (or other user-agent string information), IP address, sound, video, Internet history, software history, etc. This information can be transmitted to an emergency contact. Other information may include pre-recorded messages, e.g. a voice recording. Furthermore, configuring 302 may include any aspect of loading, installing, or otherwise preparing the distress routine.

For the disabled-user specialty version of the present invention, the pre-loading step and database bearing the data for the same takes on a heightened significance. A disabled user may be relying solely or primarily on the innate features of the phone, rather than as a mere conduit, to convey information concerning presupposed emergencies related to the user or the user's circle of acquaintances (or other). Users having diminished speaking capabilities or hearing capability in particular may desire to input significant amounts of information into the databases of the system 100 in order have an ability to convey this information at the appropriate time during the session with the emergency operator. Examples of information that can be uploaded into the system include two primary types of information: circumstantial information and biographical information.

Biographical information according to the present invention can include any information that describes one or more individuals. The information can be identity based related to the person or group of persons utilizing the device 100. The identity information can include names, addresses, heights, weights, hair color, eye color, disabilities, or other relevant descriptive information. The identity may be significant because devices can be used by more than one individual, and the ability to cycle through multiple identities during a traumatic event can be important. For example, a first identity may include the name of the device (here, a smartphone) owner, the name of the spouse of the smartphone owner, one or more children of the smartphone owner, the name of a person being cared for (e.g., in the case of baby-sitting or prolonged care, such as that provided by nurses), etc. This information will later be exhibited in a communication master menu 506 as shown in FIG. 13. As shown in FIG. 13, the present invention exhibits the information principally through an avatar 520a, which includes a graphic representation of the information for which stands and optionally a brief textual description 522 of the information. The avatar 520a to the farthest left and highest portion of the menu 506 depicts a person and include text underneath the same. The avatar may include a predetermined icon available with the invention or perhaps be added by the user taking a self-photograph. The textual portion may include any form of self-identification, including the name, full or partial, nickname, or simply "ME." Tapping this information leads to the ability to transmit such portions of the identity as the individual chooses to associate with this avatar. However, it is preferred that the user associate discrete concepts with each avatar, such that one or more avatars may be used by the user in communicating a complete thought to an operator. The master menu 506 acts subsequent to connection 310 to the emergency operator and acts as a chaperone for the communication.

The master menu 506 is not simply a basis for transmitting information. The master menu further serves as a grander control utility that allows a user to replicate and monitor a bilateral conversation with the emergency operator. The master menu 506 utility indicates a connection status 524a at all to show the user that there is indeed the capability to communicate data to an operator and receive data simultaneously. The preferred means for such status is the connection utility 524 which can include such controls and indicators related to the bilateral flow of communication as agnostic to the data being communicated. Exemplary status indicators include a communication status indicator 524a that indicates the existence of a connection to an emergency operator. Flow indicators 524c indicate the direction of transmitted information, particularly 'to' and 'from.' This is significant as the hearing impaired often rely on the visual cues to indicate whether a person on the other end of an oral communication device, e.g. telephone, is speaking. It is important in an emergency situation not to "talk over" another party such that information becomes garbled. A hearing-impaired user can thusly see when an operator is speaking or silent, and provide information in latter situations. Furthermore, the present invention has applications in emergency situations wherein private communications are of paramount importance, for example hostage situations, kidnap circumstances, or other situations whereby it may be an advantage not to broadcast publicly the existence of an emergency communication. Preferred forms of the flow indicators 524c include a transmission status that is dimensionally alterable based on a proposed transmission time. Naturally, because outgoing information is under greater control than incoming information, this is more applicable to the same. The avatars of 524d may fill up from left-to-right based on the time fraction of the transmission as a ratio of time expended to time expected. So, for a short transmission of "HELP" as transmitted, the sound avatar may indicate a proposed time of two seconds, at one second the avatar is unfilled; at one second the sound avatar is half filled; and at two seconds the avatar is completely filled.

Therefore, a user can press an identity avatar 520a to speak her name to the operator. Significantly, the present invention allows the user to mute both incoming and outgoing sounds while still permitting the audible transmission of information to the operator. Speaker controllers 524d indicate the ability of the user to silence incoming and environmental noise. Toggling the status of incoming noise permits a user to participate in the conversation with the operator without hearing the sounds coming from the operator. This may be an advantage in emergency situations described above wherein silent operation is important to the user. Instead of a "speaking" user audibly speaking information, the speaker/user pushes the avatar for the data that she desires to transmit and this data is transmitted in audible form to the operator. As the information is transmitted, the flow indicator 524c provides an indication of its audible status. In the present depiction the outgoing audible information indicator is lighted or blinks as the information is spoken to the operator. When the audible conveyance terminates, the indicator ceases to be lighted or ceases to blink. Although not ideal, the present invention allows the sole conveyance of information to be from the device 100 speaking the information of the avatar to the operator with ambient/environmental noise completely filtered out of the transaction, and/or with all audible noises from the operator filtered out of the exchange. This can be selected via two indicators 524d to be unilaterally muted, bilaterally muted, or wholly unmuted. No form of muting affects the text as spoken from the avatars information.

As can be seen in 506, the avatars cover more than simple identity. The avatars include such additional biographical data as location. Location data can be either equivalent to scoured data 594 or bespoke data. By scoured data, it is meant data that the device acquires by some form of logical analysis. The logical analysis can be acquired via analysis of tower information, internet searching, or based on information available in the TCP/IP layers. Although most smartphones have a capability through tower-pinging or other communication method to determine location, this capability is not often wholly accurate or helpfully specific. For example, a smartphone may be able to determine that the user is in a mall, but not the particular store that the user is presently occupying. The present invention allows a user to select a specific location based on multiple bases in the master distress menu. So one of the location avatars may include user-loaded information concerning location, e.g. "the mall" with an icon indicating the mall or "the gym" with an icon indicating the gym. Also, the present invention can create avatars based on possibilities gleaned during a scour. For example, if a scour determines that the user is in a mall, different stores may be listed as appropriate avatars (e.g., a question mark or structure), or if the scour determines that a user in on a road, the present invention may provide as options an interstate as an avatar along with a service road that travels adjacent and parallel to the interstate. Both of those situations involve a location that a smartphone has trouble ascertaining the specific whereabouts of a user, and the device can request that the user provide the final resolution—or default to the more likely candidate upon the user's failure to act or indication of lack of knowledge.

Circumstantial information may be depicted with avatars 520b representative of the circumstantial information along with such textual information as may be necessary or helpful. Circumstantial information of the present invention includes information helpful to the resolution of an emergency condition. Here, the user provides pre-loaded data related to emergency circumstances in which a user may find herself. Because a user will often be knowledgeable concerning dangers particular to herself, a significant advantage can be had in allowing a user to pre-load such information in advance of the emergency situation—along with such potential emergencies as could occur. For example, a user could pre-load the existence of a heart attack—along with such other necessary information, perhaps relating to information concerning a previous heart-attack and special instructions. A user could pre-load allergy attack information along with necessary instructions for EMTs, such as, the type of allergy as the location of special drugs or the user's intolerance for specific treatments.

Figure 14:
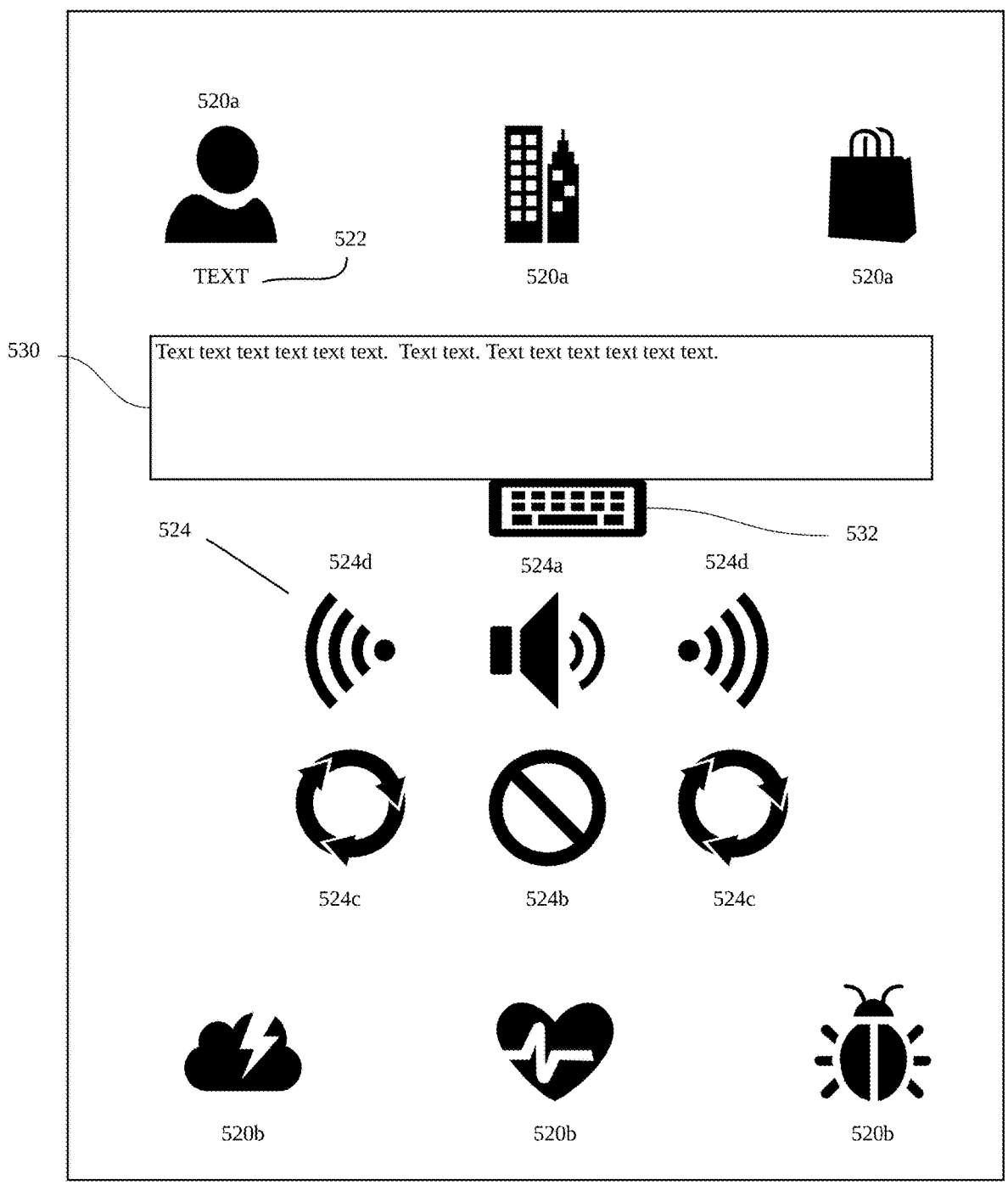
FIG. 14 is a view of a system of the present invention.

Preferred circumstantial information avatars 520b and information relate directly and specifically to emergency service providers. The avatars can relate to Police, EMT, Ambulance, Hospital, and other conclusory information avatars. The pre-loaded information can include simplistic statements ready for audible transmission that include statements such as: "I need police assistance" or "I need medical assistance." The avatars depicted in FIG. 13 directly relate to the factual circumstance related to the emergency, which the present invention then determines the appropriate authority to contact based on the emergency. For example, the lightning strike, heart attack, and bug avatars shown may directly relate to the emergency information corresponding to the avatar, for example "Help, I have just been stung by a bee and I am allergic to bees. Please send emergency medical assistance." These simplistic statements can be part of the standard data 590 pre-loaded into the device by the manufacturer. Such standard forms of transmission and data can be provided as a default or template for the user. The circumstantial avatars could further include some mixture of conclusory avatars, e.g. police avatars and hospital avatars, along with circumstantial informational avatars. Accordingly, a combination of identify and circumstantial information forms a complete communication with an emergency service provider. The user can contact the avatars as many times as is necessary to form the rudimentary communication in which she wishes to engage. As is shown in FIG. 14, the present invention may also include contemporaneous text-to-voice capabilities for the transmission of distress information. The contemporaneous text can utilize any of the muting or other adaptations of the present invention, and the present invention can use the text screen 530 to permit the entry of text through a keyboard, which preferably is accessed via a keyboard icon 532. Furthermore the present invention can attempt to provide a running voice-to-text adaptation of information from the operator.

Returning to FIG. 12, the present invention engages in a region scour 510 in which tower information relays information concerning regions applicable to the device communication. The most basic form of the scour includes a search for region codes in the metadata related to the communication, and from the metadata, the present invention applies a region adapter 512. The region adapter 512 of the present invention includes a filter that applies desired translations and adaptations to data concerning the emergency distress signal. Preferred adaptations include a regional determination of available emergency providers. For example, in most regions there will be a policing agency with a direct contact, e.g. 911 in the United States, but there may also by a poison control and direct medical emergency contact. The present invention can determine the applicable region to the device via metadata, and through an innate look-up-table or wide area network data scour 594, the present invention can add or drop avatars of emergency providers and/or modify the contact information related to the emergency providers. For example, a telephone may recognize the proximity of a device to the Canadian national boundary from the U.S. and offer as avatars both a Canadian Policing Emergency Contact as well as a U.S. Policing Emergency Contact. Alternatively, the present invention can substitute one for the other. The present invention may further provide such transformations as may be appropriate because the user is entering the French-speaking province of Quebec such that there is not only a modification of emergency contacts, but also of the pre-loaded, bespoke information.

Furthermore, the regional adapter 512 is meant to apply translation filters to the Bespoke Distress Operators 508 as well as any other data that is capable of access in the Distress Communication Master Menu 506 or Intermediate Menu 570. A device that has been recognized as being in Germany can translate the phrase "Help. I have been stung by a bee and I am allergic to bee stings" to "Hilfe. Ich bin von einer Biene gestochen worden und ich bin allergisch gegen Bienenstiche." The importance of the pre-loaded data is that the information can be translated as soon as a new region code is recognized rather than waiting for the emergency distress signal itself. Accordingly, the present invention would not tie up data processing resources necessary for the emergency transmission to apply translations that preferably occurred previously.

The present invention may also apply an alarm to discerning a new region code. Many users are wary of traveling to regions with different norms and conventions, and a user may decide not to enter the new region. The notification may occur pursuant to the main menu 506 with the notification posted textually in the text box 532.

The present invention can apply the information in one or more menus 506, 570. The menus of the present invention preferably includes one menu through which all transmission communication data occurs for the sake of simplicity. However, the present invention can use additional menus, a second menu hereby termed an intermediate menu 570 for the sake of simplicity. Any of the information suitable for one menu may be used in an additional menu. So the present invention could logically break of the biographical data and circumstantial data in two menus, or could apply the text services 530 of the present invention to an intermediate menu 570. The intermediate menu is preferably used in accordance with data that has been transformed or otherwise adapted through the region negotiator and adapter 512.

Although the present invention has been largely described in connection with emergency and distress services, anywhere in the application whereby a distress signal may be sent, the present invention could apply to any form of communication transmission. For example, the avatars may relate to restaurants as circumstantial information rather than circumstances related to emergencies. Many types of commercial transactions can utilize the communication menu 506, 570 of the present invention to engage in simplistic commercial communications such as avatars related to biographic data 520a as well as circumstantial information related to the circumstances of the call, e.g. the size and attributes of the pizza that the user desires to order.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A distress signal transmission device comprising:
    a computer with a body and having an arithmetic logic unit ("ALU"), a nontransitory computer-readable storage medium in signaled communication with said ALU, a display on said body having a touch digitizer; and a transmitter for the transmission of data to an external entity;
    a distress routine, recited within said storage medium, having the device's current GPS location and access to an emergency contact database, and adapted to initiate an audio distress transmission that upon connection to a distress operator initializes a distress assistance menu;

a pre-loaded factual database having a data input subroutine adapted to accept and store free form data from a user;

said distress assistance menu comprising: (a) a graphic list of a biographic audio transmission selectors corresponding to multiple biographical information avatars corresponding to a biographical audio transmission selector having biographical content; and (b) a graphic list of circumstantial audio transmission selectors corresponding to multiple circumstantial information avatars having circumstantial content;

a negotiator adapted to scour applicable region codes and conform said multiple circumstantial information avatar content to said region code, and adapted to transforms said user free form data based on said region code; and a transmission indicator, graphically variable based on at least two circumstances: (i) the source status of audio transmission, and (ii) a time status of said audio transmission.

2. The device of claim 1 wherein said negotiator generates an alarm pursuant to recognition of a new region code.

3. The device of claim 2 wherein said negotiator transforms said user free form data based on said region code and provides said transformed data optionally supplementing an original free form data in an intermediate menu, exhibited subsequent to consummating at least one of said circumstantial audio transmission selectors and biographic audio transmission selectors.

4. The device of claim 1 wherein said negotiator transforms said user free form data based on said region code.

5. The device of claim 4 wherein said negotiator transforms said user free form data based on said region code and provides said transformed data optionally supplementing an original free form data in an intermediate menu, exhibited subsequent to consummating at least one of said circumstantial audio transmission selectors and biographic audio transmission selectors.

6. A distress signal transmission device comprising:

a computer with a body and having an arithmetic logic unit ("ALU"), a nontransitory computer-readable storage medium in signaled communication with said ALU, a display on said body having a touch digitizer; and a transmitter for the transmission of data to an external entity;

a distress routine, recited within said storage medium, having the device's current GPS location and access to an emergency contact database, and adapted to initiate an audio distress transmission that upon connection to a distress operator initializes a distress assistance menu;

said distress assistance menu comprising: (a) a graphic list of a biographic audio transmission selectors corresponding to multiple biographical information avatars corresponding having biographical content; and (b) a graphic list of circumstantial audio transmission selectors corresponding to multiple circumstantial information avatars having circumstantial content generated from free form data;

a pre-loaded trigger database having a data input subroutine adapted to accept and store free form, graded and substantially repeatable distress input from a user and apply said distress input to initiation of at least one of: (a) said distress assistance menu and (b) said audio transmission selectors; and a transmission indicator, graphically variable based on at least two circumstances: (i) the source status of audio transmission, and (ii) a time status of said audio transmission.

7. The device of claim 6 wherein said trigger database includes a load guide adapted to request an original bespoke user distress input and a comparison input, and relate said original bespoke user distress input to said comparison input to discern repeatability.

8. The device of claim 7 wherein said trigger database is adapted to refuse said original bespoke user input based on said repeatability.

9. The device of claim 7 wherein said trigger database is adapted to accept multiple user inputs to mimic said original distress input and discerning an average distress input.

10. The device of claim 9 wherein said trigger database generates a distress input variation range for application to an emergency distress input.

11. The device of claim 9 wherein said trigger database selects a representative distress input from said multiple user inputs to mimic said original distress input.

12. The device of claim 6 wherein said distress input includes motion.

13. The device of claim 6 wherein said distress input includes sound.

* * * * *